Figure 1:
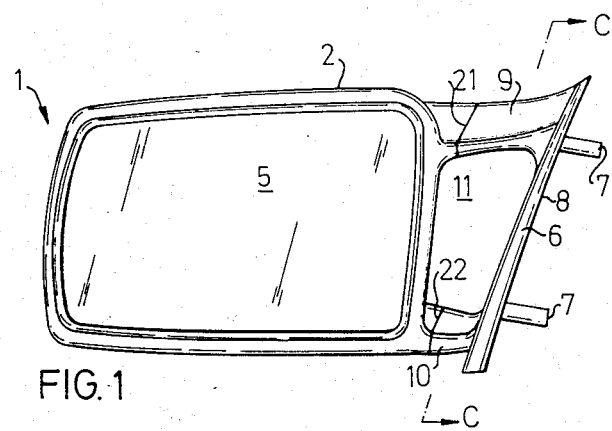

United States Patent [19]

Knutson et al.

[11] Patent Number: 4,585,316

[45] Date of Patent: Apr. 29, 1986

[54] EXTERIOR REAR VIEW MIRROR HAVING WING-SHAPED SUPPORT ARMS

[75] Inventors: Kjell K. A. Knutson; Carl U. Dahl, both of Trollhättan, Sweden

[73] Assignee: Saab-Scania Aktiebolag, Sodertalje, Sweden

[21] Appl. No.: 556,176

[22] Filed: Nov. 29, 1983

[30] Foreign Application Priority Data

Nov. 29, 1982 [SE] Sweden ............................. 8206798

[51] Int. Cl.⁴ ............................................. G02B 7/18
[52] U.S. Cl. ................................. 350/582; D12/187
[58] Field of Search ............ 350/582, 584; D12/187; 248/475.1, 900, 631

[56] References Cited

U.S. PATENT DOCUMENTS

| D. 276,514 | 11/1984 | Envall et al. | D12/187 |
| 4,449,796 | 5/1984 | Janssen et al. | 350/582 |

FOREIGN PATENT DOCUMENTS

| 2511290 | 9/1975 | Fed. Rep. of Germany | 350/584 |
| 2704226 | 8/1978 | Fed. Rep. of Germany | 350/584 |
| 3025745 | 2/1982 | Fed. Rep. of Germany | |
| 1475058 | 6/1977 | United Kingdom | |
| 1515934 | 6/1978 | United Kingdom | |
| 1558870 | 1/1980 | United Kingdom | |

Primary Examiner—Jon W. Henry
Attorney, Agent, or Firm—Cushman, Darby & Cushman

[57] ABSTRACT

An external vehicle rear view mirror comprises a mirror glass in a mirror housing and, to one side of the mirror housing, a mirror foot for attaching the rear view mirror to a vehicle body. Two vertically spaced apart supporting arms join the mirror housing to the mirror foot. Each of the supporting arms has an essentally wing-profile-shaped cross-section, and they are so oriented that they give air passing them a downwash. This reduces drag as well as dirt collection on the mirror and on a vehicle side window.

9 Claims, 3 Drawing Figures

EXTERIOR REAR VIEW MIRROR HAVING WING-SHAPED SUPPORT ARMS

The present invention relates to an external vehicle rear view mirror, which comprises a mirror glass in a mirror housing and, to one side of the mirror housing, a mirror foot for connecting and fixing the rear view mirror to a vehicle body, the mirror housing being joined to the mirror foot via an upper supporting arm that joins an upper portion of the mirror housing to an upper portion of the mirror foot, and via a lower supporting arm that joins a lower portion of the mirror housing to a lower portion of the mirror foot, thus providing between the supporting arms, the mirror housing and the mirror foot, a flow-through hole.

External side rear view mirrors for vehicles often have large dimensions, if good rear vision is desired without excessive distortion of the mirror image. If such a rear view mirror is also constructed with remote adjustment means for the mirror position, this will as a rule additionally increase the dimensions. This will result in increased drag as the vehicle moves, subjecting the rear view mirror to large stresses and accompanying irritating vibrations. The latter disadvantage can be counteracted by designing the rear view mirror with a relatively large mirror foot for contact with the vehicle body. The large dimensions of the mirror housing and the mounting means produce, however, an unfavorable air flow past the rear view mirror, which causes both the rear view mirror and the front side window of the vehicle to be rapidly dirtied when driving, partly as a result apparently of the fact that a vacuum zone is formed behind the mirror, towards which dirty water, road particles and the like are drawn.

To remedy this disadvantage of the increased drag of a large rear view mirror, it is previously known to make such a rear view mirror streamlined. This reduces the drag but does not eliminate the creation of a vacuum zone behind the rear view mirror, nor the dirtproblem involved.

A previous solution to the dirtproblem is to arrange a wind deflecting means along one of the edges of the rear view mirror, which means is designed to direct air flow across the glass of the rear view mirror. This reduces the vacuum behind the mirror to some degree, but not, however, the dirtying of the mirror glass. The air flow sweeping across the mirror glass contains particles of dirt, and therefore there is a risk that, contrary to what was intended, the mirror will become even dirtier.

In order to reduce the drag of the rear view mirror it is also known to join the mirror housing and the mirror foot via two spaced apart supporting arms. The dirt problem still remains, however.

The purpose of the present invention is to provide a rear view mirror which intended, when mounted on a vehicle, to prevent dirtying of the rear view mirror glass and the side window of the vehicle better than known designs, and to have a relatively low drag as well.

According to the invention both supporting arms have an essentially wing-profile-shaped cross-section and are so oriented that they give air flowing through the flow-through hole a downwash.

By giving the supporting arms, which join the mirror housing and the mirror foot, wing profile cross-sections, an essentially laminar flow around the supporting arms is obtained in the direction of motion of the vehicle. By making the cross-sections of the supporting arms relatively long as well, it is possible to control the air flow around the rear view mirror so that the vacuum behind the rear view mirror is reduced and also so that the air flow is deflected downwards along the side of the vehicle. This prevents or at least reduces the dirtying of the rear view mirror and the side window, as well as reducing the drag of the rear view mirror.

Further characteristics and advantages of the invention are revealed in the following description of an embodiment exemplifying the invention. The description makes reference to the accompanying drawings, of which FIG. 1 shows a front view of a rear view mirror according to the invention, FIG. 2 shows the rear view mirror according to FIG. 1 as seen from above, and FIG. 3 shows a sectional view along the line C—C in FIG. 1.

Figure 2:
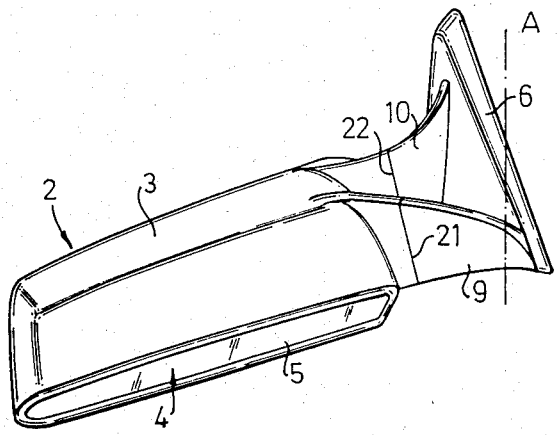
Figure 3:
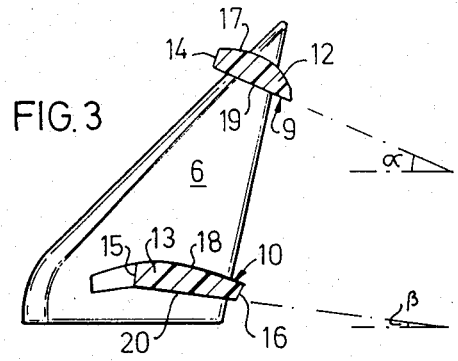

The side rear view mirror 1 shown in the figures is designed to be mounted on the left hand side of a passenger car and the view shown in FIG. 2 largely corresponds to the normal position of the rear view mirror 1 relative to the longitudinal axis A of the passenger car.

The directions mentioned in the following description refer to the directions applicable when the rear view mirror 1 is mounted on the passenger car.

The side rear view mirror 1 according to the invention comprises a mirror housing 2 made of a plastics material. The mirror housing 2 is bowl-shaped with a forwardly directed double-curved, convex surface 3. The mirror housing 2 houses in a cavity 4 a reflecting mirror glass 5, which is adjustable by means of a conventional ball and socket mechanism (not shown) arranged between the mirror glass 5 and the mirror housing 2.

The rear view mirror 1 also comprises a foot 6 joined to the mirror housing 2. It is also made of a plastics material and is designed to be fixed to the vehicle body. More specifically, the mirror foot 6 is designed to be fixed to the forward portion of the left hand front door at the level of its side window. Two mounting bolts 7 are cast into the mirror foot 6, and are designed to fit into corresponding mounting holes (not shown) in the car door and to be fixed to the same by means of common nuts (not shown). In such a mounting, a contact surface 8 of the mirror foot 6 rests against the side of the door.

The mirror housing 2 and the mirror foot 6 are joined to each other via an upper supporting arm 9 and a lower supporting arm 10, of which the upper supporting arm 9 joins the respective upper portion of the mirror housing 2 and the mirror foot 6 and the lower supporting arm 10 joins the respective lower portions of the mirror housing 2 and the mirror foot 6. Between the two supporting arms 9, 10, the mirror housing 2 and the mirror foot 6 there is a through opening, a so-called flow-through hole 11.

FIG. 3 shows a sectional view through the two supporting arms 9,10 and reveals that the two supporting arms 9,10 have wing-profile-shaped cross-sections 12,13. The flat underside 19 of the upper supporting arm 9 has an angle of inclination $\alpha$ relative to the horizontal plane, while the flat underside 20 of the lower supporting arm 10 has an angle of inclination $\beta$ to the horizontal plane. Tests have confirmed that the angle $\alpha$ should be in the region 20°–40°, preferably in the region 27°–30°, and the angle $\beta$ should be in the region 3°–10°, preferably in the region 6°-7°, to achieve the desired reduction of drag and reduce dirtying of the mirror glass and the side windows.

A forward side surface 14 on the upper supporting arm 9 as well as a forward side surface 15 and a rear side surface 16 on the lower supporting arm 10 are made more flat than would be prescribed for an ideal wing profile. The design can be considered to be a compromise to enable the upper surfaces 17,18 and the lower surfaces 19,20 to define feasible wing profile shapes when designing the supporting arms 9,10.

The mirror housing 2 and the mirror foot 6, are made as two separate parts, with parts of the two supporting arms 9,10 integral therewith. These supporting arms parts abut against each other along an upper dividing plane 21 and a lower dividing plane 22, and the two supporting arms 9,10 are resiliently fixed to each other in a manner known per se, conforming to current regulations regarding the flexibility of rear view mirrors subjected to substantial external force. The assembly of said units 2,6 and their component parts will not be described in more detail here.

The movement of a vehicle equipped with a rear view mirror 1 according to the invention will cause air to flow over and under the supporting arms 9,10 as well as through the flow-through hole 11. This largely prevents the formation of a vacuum zone behind the rear view mirror 1, as well as preventing lateral flow and dirtying of the mirror glass 5. The air flow around the supporting arms 9,10 is essentially laminar and by virtue of the fact that the cross-sections of the supporting arms 9,10 are relatively elongated, accurate directing of the air flow through the hole 11 is possible. The inclination of the two supporting arms 9,10 relative to the horizontal plane causes deflection of the air flow downwards, thus preventing particles of dirt in the air flow from striking and dirtying the vehicle side window.

By directing the air flow through the hole 11 in the rear view mirror 1, the total drag of the rear view mirror 1 is also reduced.

The invention is not limited to the embodiment exemplified here, but can be modified in alternative embodiments within the scope of the attached patent claims. For example, the design of the rear view mirror 1 can be simplified by making the mirror housing 2, the foot 6 and the two supporting arms 9,10 as a single piece. This eliminates the resilient connection between the mirror housing 2 and the foot 6.

In other modified embodiments, the supporting arms 9,10 can be integrated to a greater or lesser degree with the mirror housing 2 or the foot 6, and the supporting arms 9,10 can also be made as completely separate parts.

What we claim is:

1. An external rear view mirror for a vehicle comprising a mirror housing supporting a mirror, first and second supporting arms extending essentially horizontally outward from the housing and connected to a mirror foot, said foot being connected to the vehicle body, the first arm being disposed vertically above the second arm thereby defining a flowthrough hole, the arms having essentially a wing-shaped cross-section such that air flowing through the flowthrough hole is directed downwardly with respect to the vehicle.

2. A rear view mirror according to claim 1, wherein the first supporting arm has an angle of inclination relative to the horizontal plane that is greater than a corresponding angle of inclination of the lower supporting arm.

3. A rear view mirror according to claim 2, wherein the angle of inclination of the first supporting arm is in the region 20°-40°.

4. A rear view mirror according to claim 2 wherein the angle of inclination of the first supporting arm is 27°-30°.

5. A rear view mirror according to claim 2 wherein the second arm has an angle of inclination of 3°-10°.

6. A rear view mirror according to claim 2 wherein the angle of inclination of the second arm is 6°-7°.

7. A rear view mirror according to claim 1, wherein the supporting arms are integral with the mirror housing.

8. A rear view mirror according to claim 7, wherein the mirror housing and the mirror foot are made as two separate parts resiliently held together.

9. A rear view mirror according to claim 1 wherein the supporting arms are integral with the mirror foot.

* * * * *